United States Patent Office 3,467,528
Patented Sept. 16, 1969

3,467,528
PROCESS FOR PREPARING RICE DESSERT
COMPOSITION
Augustine D'Ercole, White Plains, Aristides Krias, Brooklyn, and Robert Tewey, Irvington, N.Y., assignors to General Foods Corporation, White Plains, N.Y., a corporation of Delaware
No Drawing. Continuation-in-part of application Ser. No. 395,590, Sept. 10, 1964. This application Mar. 20, 1968, Ser. No. 714,439
Int. Cl. A23l 1/00, 1/10
U.S. Cl. 99—139
4 Claims

ABSTRACT OF THE DISCLOSURE

A dry instant rice pudding product reconstitutable in hot water or milk is prepared by blending precooked rice with a sugar syrup to form a first coating on the rice grains, and blending the sugar-coated rice with an aqueous starch slurry to form a second coating on the rice grains, the amount of water used to prepare the coating being limited such that no subsequent drying step is necessary.

---

This application is a continuation-in-part of copending application Ser. No. 395,590, filed Sept. 10, 1964, and now abandoned.

The present invention relates to an improved rice product and to a process for its preparation. More particularly, it relates to an improved rice pudding mix.

The preparation of rice desserts, e.g., rice pudding, is tedious and time consuming due to the long cooking time required for the rice. Even when a precooked rice, such as "Minute" rice, is used, the preparation of rice pudding involves the measuring out and combining of many ingredients followed by a rather lengthy cooking time. The personal attention of the individual preparing the pudding is necessitated by the frequent stirring required. For example, using a precooked rice, such as "Minute" rice, the preparation of rice pudding requires the combining of premeasured quantities of rice, sugar, salt, nutmeg, milk, butter and vanilla. The requisite amounts of each of these ingredients when combined are heated to boiling and then cooked for about 20 minutes over low heat with frequent stirring. Then the yolk of an egg to which 2 tablespoons of milk has been added is beaten and slowly added to the hot mix with rapid stirring. The resulting pudding is then ready for serving.

Because of the long and involved procedure required to make rice pudding, and because many housewives hold full time jobs, this delightful dessert is seldom made. From time to time rice pudding mixes have appeared on the market but these have not been very successful because of the poor texture and flavor of puddings made therefrom. Furthermore, when rice pudding is prepared from one of these mixes the entire package has to be used because the sugar and flavoring ingredients settle to the bottom of the package during storage and handling. The prior art rice pudding mixes, like homemade rice pudding, is thickened by the starch released from the rice grains. Accordingly, a relatively long cooking time is required when making rice pudding from these mixes because the starch is released very slowly from the rice.

A rice pudding mix has now been invented which does not have the above-noted disadvantages of the prior art products. Rice pudding having excellent flavor and texture can be easily prepared from the mix without the necessity of mixing several ingredients or enduring the long cooking periods usually required to thicken the pudding. Furthermore, the powdered ingredients are coated to the surface of the rice grains; hence the pudding mix is ideal for portioning from a multiserving package.

It is, therefore, an object of the present invention to provide an improved dry rice pudding product. It is a further object of the invention to present a process for preparing a dry rice product from which a rice pudding can be easily and quickly prepared. Still another object is to present an improved storage-stable rice product, the smallest unit of which contains all of the dry ingredients necessary for preparing rice pudding. These and other objects of the invention will become apparent from the following description and examples.

According to the present invention, a uniform rice product, wherein each individual rice grain is coated with the dry ingredients needed to make rice pudding, is prepared. These ingredients, moreover, are present in the ratios desirable in rice pudding. In practicing the invention, rice grains are blended with a sugar syrup to form a first coating on the rice. The sugar coated rice is then blended with an aqueous starch slurry to form a second coating on the rice. The starch coating is applied after the sugar is coated on the rice because sugar has a tendency to absorb moisture from the air and would, if it formed the outside coating, cause the product to become tacky, with resultant sticking together of the rice grains. The starch, on the other hand, serves as an excellent outer coating because it hardens upon drying to produce a durable non-tacky surface, thereby rendering the product free flowing. In addition to forming a dry coating on the rice, the starch also serves to thicken the pudding when it is prepared. This is accomplished by gelatinization of the starch upon heating in milk or water. Starch alone is sufficient to form a dry outer coating on the rice and adequately thicken the pudding; however, in the preferred embodiment of the invention an edible gum is added to the starch slurry to reduce flaking of the coated rice product and to help thicken the pudding. Typical gums that can be used to supplement the starch are gum tragacanth, locust bean gum, gum guar, etc.

The usual additives necessary to produce a tasty rice pudding can be incorporated into either the sugar syrup or the starch slurry or both, as desired. Thus, ground spices, flavoring materials, and edible coloring materials may be dissolved either in the water used to prepare the sugar syrup or the water used to make the starch slurry. As the sugar syrup is usually prepared by heating sugar in a limited quantity of water, those flavoring materials which would be affected by heat, such as volatile flavoring ingredients, are preferably blended with the starch.

Precooked rice is used in preparing the product of the present invention. Any of the well known methods of preparing precooked rice can be used, the important requirement being that the rice grains are substantially whole and develop a soft though firm texture after being heated in water for a few minutes. Typical of the precooked rices which may be used in the invention are those prepared according to U.S. Patents Nos. 2,438,939, 2,696,156 and 2,696,158.

The sugar syrup used to form the first coating on the rice can be conveniently prepared by dry blending predetermined quantities of sugar, salt, flavoring and coloring, adding a limited quantity of water and heating for a sufficient period of time and at a temperature high enough to dissolve all of the water-soluble dry ingredients. The amount of water present should preferably be limited to the minimum amount required to effect solution at elevated temperatures so that when the sugar syrup is cooled it will solidify to a dry mass.

The starch slurry is prepared by mixing starch and a limited quantity of water sufficiently to form a uniform dispersion. Any of the common starches can be used such as corn, rice, potato or tapioca starch, although corn starch is preferred because of its excellent gelling qualities and bland flavor. The starch is preferably ungelatinized because of its greater gelling properties, however, some or all of the starch may be pregelatinized. As noted above, the starch slurry may contain an edible gum such as gum tragacanth, flavoring and other additives. It is preferable to add volatile ingredients to the starch slurry rather than to the sugar syrup because of the likelihood that volatile components would be driven off in the heating step used to form the sugar syrup.

In preparing the coated rice product a sugar syrup is formed as described above and blended sufficiently with a predetermined quantity of precooked rice to evenly coat the rice with the sugar syrup. The resulting mixture is blended with the starch slurry and mixed until the rice is dry and no longer clumps. The product is then ready for packaging. It can be packaged in small packets containing enough rice product to prepare four to eight servings or it can be packaged in larger containers from which any desired amount can be poured.

As a modification of the above, the starch gelling system can be supplemented with a milk protein coagulating agent such as trisodium pyrophosphate. This is particularly advantageous where a shorter heating period is contemplated in the preparation of the pudding, as is the case when the second coating contains pregelatinized starch.

In preparing rice pudding from the dry mix, fresh milk is brought to a boil and a predetermined quantity of the rice pudding mix is added to the milk and the mixture is simmered with frequent stirring for about 10 minutes, or until the pudding reaches the desired consistency and texture. If desired, raisins may also be added to the hot milk. After being cooled the pudding is ready to be served. If a lighter pudding is desired, an egg can be beaten into the rice pudding prior to cooling.

The rice pudding mix of the invention can be modified by adding powdered egg and powdered milk to it so that the pudding can be prepared simply by heating a portion of the mix in water.

The amount of water used in each of the foregoing steps is controlled so that the final moisture level of the dry rice product does not exceed about 10% by weight. The preferred final moisture level is about 7 or 8%. Because of the use of a controlled quantity of water with each of the foregoing blends no final drying step is required. The total mixing time is approximately 15 minutes.

This two-step coating procedure produces a coated rice pudding product which is remarkably free from flaking. The product had a flake-off of less than 1% based on the total weight of ingredients when measured by Ro-Tap tests using a 16 mesh screen (U.S. Standard mesh).

The following examples will serve to illustrate a specific embodiment of the invention.

EXAMPLE I

A premix was prepared using 3.20 lbs. of sugar, 0.14 lb. of salt, 20.63 grams of vanilla flavor and 3.15 grams of egg shade color. A second premix was formed by blending 0.534 lb. of corn starch, 2.4 grams of cinnamon and, 2.2 grams of nutmeg. The first premix and 0.59 lb. of water were mixed in a jacketed Day mix (Sigma type), the jacket steam pressure being set at 40 p.s.i.g. The mixture was brought to a boil and 4.27 lbs. of "Minute" rice was added to the boiled sugar mix with gentle agitation. The steam was then turned off but the mixing was continued. To the second premix consisting of starch, cinnamon and nutmeg, ¾ lb. of water was added with stirring to form a slurry which was then added to the sugar-coated rice. The mixer was allowed to run until the rice mix was dry and no longer clamped.

Five ounces of the above mix and one ounch of raisins were added to 2½ cups of milk heated to boiling. The heat was reduced and the mixture was allowed to simmer for about 10 minutes with frequent stirring after which it was cooled. The resulting pudding had a smooth, thick consistency and excellent flavor.

EXAMPLE II

A dry rice product was prepared according to the procedure of Example I except that 4.4 grams of gum tragacanth was blended into the starch premix. It was observed that less flaking occurred in this product than in the Example I product.

Rice pudding was prepared from the dry mix in accordance with the directions of Example I. The pudding had excellent flavor and texture and very closely resembled old fashioned rice pudding.

Although the invention is described with reference to specific examples it is understood that many variations of the concept described are possible and accordingly the scope of the invention is limited only by the scope of the appended claims.

What is claimed is:
1. A process for preparing a dry, precooked rice dessert composition comprising blending precooked rice with hot sugar syrup to form a first coating on the rice grains and blending the sugar-coated rice with an aqueous starch slurry to form a second coating on the rice grains, the amount of water used to prepare the coated rice composition being controlled so that the final moisture content of the composition does not exceed about 10% by weight and the starch serving to provide a nontacky surface, thus rendering the product free-flowing and additionally serving as a thickening agent when the necessary liquids are added to form the dessert.

2. The process of claim 1 wherein the starch slurry contains an edible gum.

3. A process according to claim 2 wherein the sugar syrup contains flavoring ingredients.

4. A process according to claim 2 wherein the starch-gum slurry contains flavoring ingredients.

References Cited
UNITED STATES PATENTS
2,278,465  4/1942  Musher _____ 99—83

OTHER REFERENCES
Rombauer et al.: "The Joy of Cooking," New York, The Bobbs-Merrill Co., Inc., 1953, pp. 716–717.

RAYMOND N. JONES, Primary Examiner

U.S. Cl. X.R.
99—83